(12) United States Patent
Dake

(10) Patent No.: US 8,345,576 B2
(45) Date of Patent: Jan. 1, 2013

(54) METHODS AND SYSTEMS FOR DYNAMIC SUBRING DEFINITION WITHIN A MULTI-RING

(75) Inventor: Steven C. Dake, Chandler, AZ (US)

(73) Assignee: Red Hat, Inc., Raleigh, NC (US)

(*) Notice: Subject to any disclaimer, the term of this patent is extended or adjusted under 35 U.S.C. 154(b) by 705 days.

(21) Appl. No.: 11/765,197

(22) Filed: Jun. 19, 2007

(65) Prior Publication Data
US 2008/0317061 A1 Dec. 25, 2008

(51) Int. Cl.
H04L 12/42 (2006.01)
(52) U.S. Cl. ......... 370/254; 370/452; 370/404; 370/258
(58) Field of Classification Search .......... 370/254, 370/222, 223, 258, 404
See application file for complete search history.

(56) References Cited

U.S. PATENT DOCUMENTS

| | | | | |
|---|---|---|---|---|
| 6,314,110 B1* | 11/2001 | Chin et al. | .......... | 370/468 |
| 6,563,833 B1* | 5/2003 | Wool et al. | .......... | 370/404 |
| 6,647,014 B1* | 11/2003 | Shimada | .......... | 370/400 |
| 6,650,618 B1* | 11/2003 | Peng et al. | .......... | 370/229 |
| 2007/0268913 A1* | 11/2007 | Denecheau et al. | .......... | 370/397 |
| 2008/0123550 A1* | 5/2008 | Pitis | .......... | 370/253 |
| 2008/0140892 A1* | 6/2008 | Fong et al. | .......... | 710/111 |

OTHER PUBLICATIONS

The Totem Single-Ring Ordering and Membership Protocol, by Amir, Nov. 1995.*
Partioning a Token Ring Network for Performance ADvantage by Mukherjee, 1988.*
"The Totem Multiple Ring Ordering and Topology Maintenance Protocol" Agarwal.*
"The Totem System" by Moser,1995.*
"The Totem Multiple Ring Ordering and Topology Maintenance Protocol" Agarwal, May 1998.pp. 93-132.*

* cited by examiner

Primary Examiner — Robert Wilson
Assistant Examiner — Pamit Kaur
(74) Attorney, Agent, or Firm — Lowenstein Sandler PC (57) ABSTRACT

Embodiments of the present invention automatically determine via heuristics optimal configurations to form sub-rings of nodes and where to position gateway processors among these sub-rings. The heuristics may be applied at a predefined timing interval configured by the user or in response to various events, such as a node failure or when a node joins the multi-ring network. Another embodiment of the invention may use automatic heuristics to determine when a suboptimal multi-ring configuration exists and formulates a new multi-ring configuration.

15 Claims, 6 Drawing Sheets

METHODS AND SYSTEMS FOR DYNAMIC SUBRING DEFINITION WITHIN A MULTI-RING

FIELD OF THE INVENTION

The invention relates generally to communication systems and, more particularly, to a system and method for forming dynamic sub-rings within multi-rings of communication nodes.

BACKGROUND OF THE INVENTION

A number of systems have been developed for providing network communications among groups of users. These systems may employ an architecture, such as a Totem ring network, in order to provide a fault tolerant structure for the network communications. Totem ring networks are relatively well known and provide for multicast delivery of messages, wherein messages may be transmitted and delivered to multiple locations, and ensure that the sequence in which messages are generated is maintained as such messages are transmitted and delivered throughout the system.

The Totem ring protocol operates by organizing the nodes of a system into one or more virtual rings of processors around which a token rotates. When a token is received by a processor, that processor may multicast any messages in its pending transmit queue. The token contains a sequence number and retransmit list.

The sequence number is used to provide a total order of messages such that each receiver can order messages in the same order. On each multicast the token's sequence number is increased. When the token is forwarded to the next node in the ring, the token sequence number is sent based upon what was received plus the number of multi-casted messages.

The retransmit list is used to request retransmission of missing messages. On receipt of a token, the processor compares the token's sequence number with its currently received messages. If any message is missing from its list, it augments the retransmit list with the missing messages. Also, upon receipt of the token, any messages in the retransmit list for which the processor has a copy are multicast by that processor.

In order to support multiple rings, the totem protocol creates gateways between the totem single rings. In general, each of the rings operates on separate multicast target addresses. Each gateway only forwards messages which are required by the other ring. In this way, the totem multi-ring protocol is more scalable. For example, it is possible for each sub-ring among a plurality to obtain the maximum throughput available and reduce latency by ½ the token rotation time in a single ring structure.

In order to determine whether to forward a particular message, the gateway nodes check character string in each message called a "group" that identifies which messages should be sent to which receivers. Each gateway maintains a list of groups that are relevant to the rings it interfaces.

Unfortunately, there are several drawbacks of the known implementations of Totem ring networks. One drawback is that the individual rings in a multi-ring system must be configured ahead of time. Thus, in order to optimize the configuration of the sub-rings, the user setting them up must be aware of the locality of communication occurs or will occur in the multi-ring network. Understandably, this information may not be available or may change frequently during operations of the multi-ring network. Utilizing an inferior setup of the sub-rings will degrade performance of the system due to excessive forwarding of messages across sub-rings.

Another drawback with multi-ring Totem ring networks is that some Totem may be geographically separated over long distances. For example, with the use of wide area networks (WAN), at least one Totem ring may span a long distance, such as a mile or several hundreds of miles. Such a span will likely result in time latencies (such as a few tens of nanoseconds, or more) between nodes on that sub-ring. Indeed, these delays may be sufficiently long to result in undesirable error rates on the Totem rings. Accordingly, it can be appreciated that the configuration of sub-rings can be critical in order to account for factors, such as geographic span of a particular ring or sub-ring.

Accordingly, it would be desirable to provide methods and system that assist in automating the configuration of Totem network rings. It would also be desirable to provide methods and systems that allow the configuration Totem network rings to change dynamically in response to operating conditions.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention automatically determine via heuristics optimal configurations to form sub-rings of nodes and where to position gateway processors among these sub-rings. The heuristics may be applied at a predefined timing interval configured by the user or in response to various events, such as a node failure or when a node joins the multi-ring network. Another embodiment of the invention may use automatic heuristics to determine when a suboptimal multi-ring configuration exists and formulates a new multi-ring configuration.

In order to support dynamic sub-rings, membership communication is sent to a specific multicast address and port combination. For example, when the heuristic has determined a suboptimal multi-ring configuration, nodes may send messages to a group subscribed to by all processors in the configuration. This message contains a list of processors and their proposed new multicast communication address and port. Once every processor has received a copy of the new multicast communication address and processor list, processors in those sub-rings that are to be reconfigured drop their token, reconfigure their internal state to use the new multicast address, and request formation of a new sub-ring configuration. Alternatively, the mechanism by which a new multi-ring is formulated is based upon the concept of using a specific multicast address with a list of processors. Therefore, in the present invention, it may be possible to avoid sending the message with the list of processor and their proposed new multicast communication address.

One skilled in the art will recognize that the present invention is not entirely based upon rings. Indeed, the present invention could be applied to any group communication mechanism that would benefit from message locality.

Figure 1:
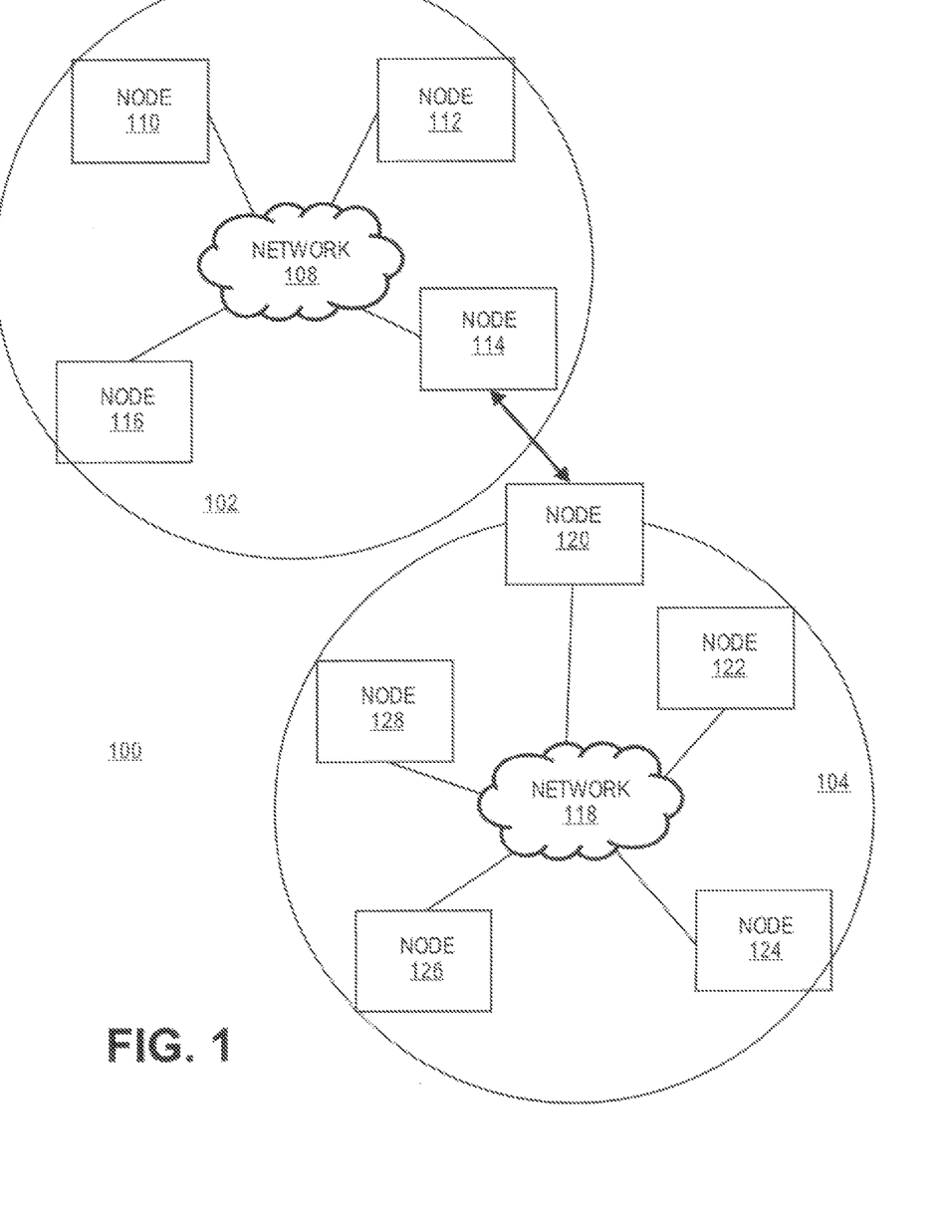
FIG. 1 illustrates an exemplary system of the present invention.
Figure 2:
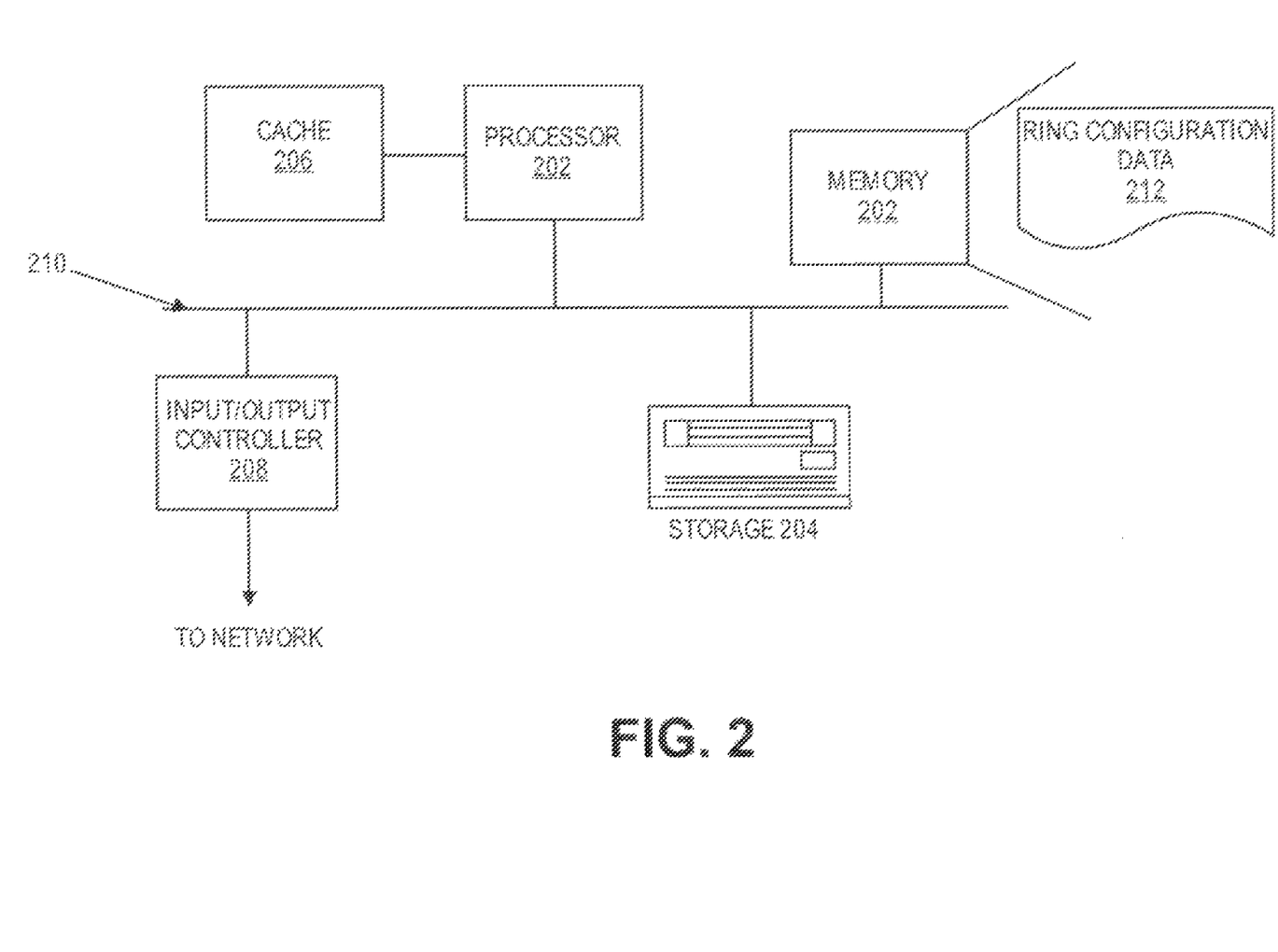
FIG. 2 illustrates an exemplary node consistent with the present invention.
Figure 3:
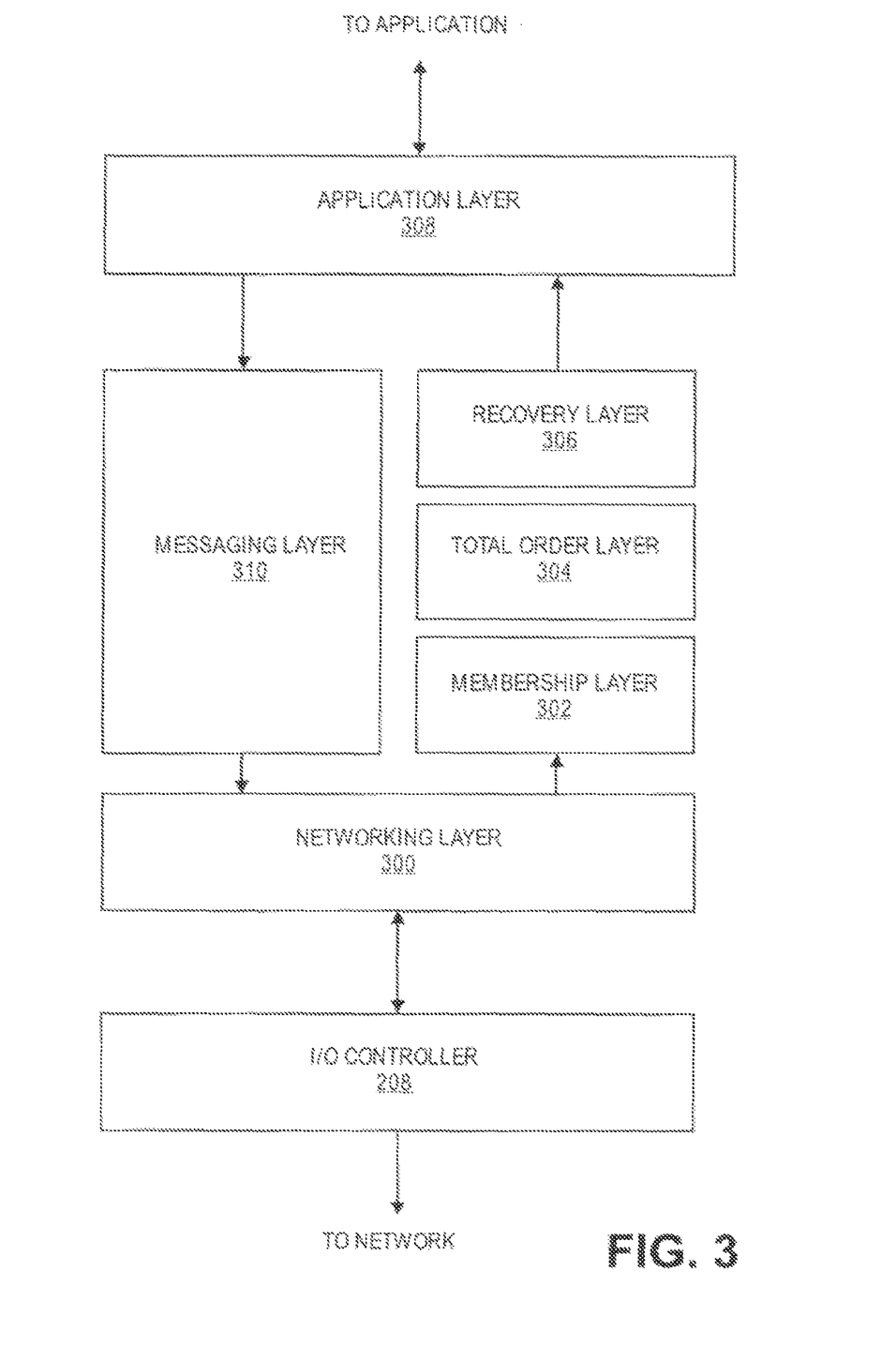
FIG. 3 illustrates an exemplary software architecture of the node shown in FIG. 2.
Figure 4:
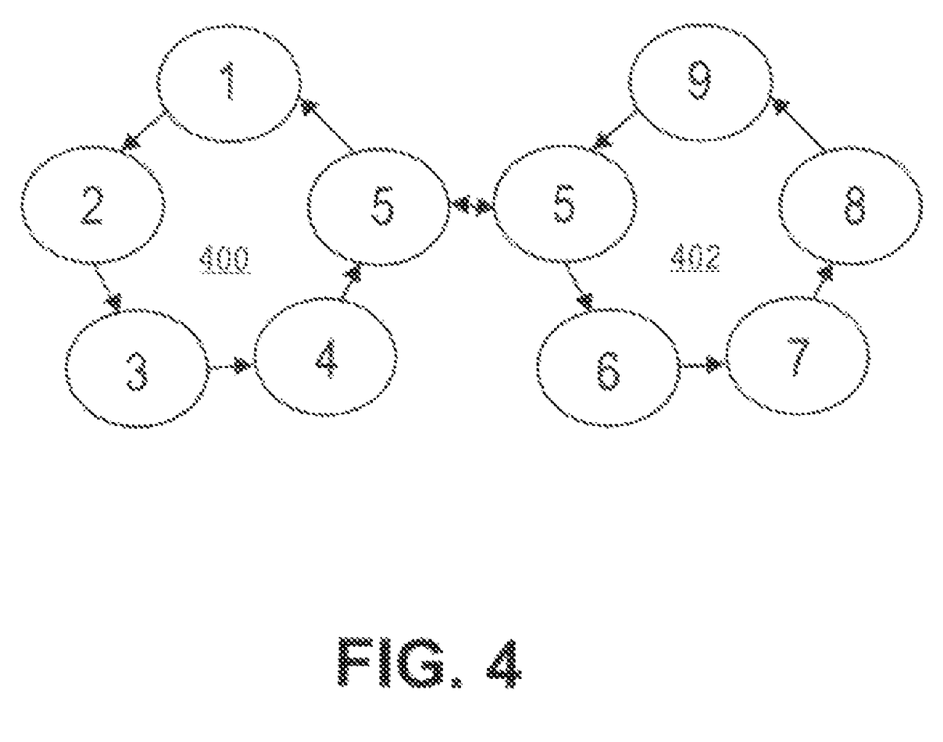
FIG. 4 illustrates an exemplary multi-ring Totem ring network having two sub-rings.
Figure 5:
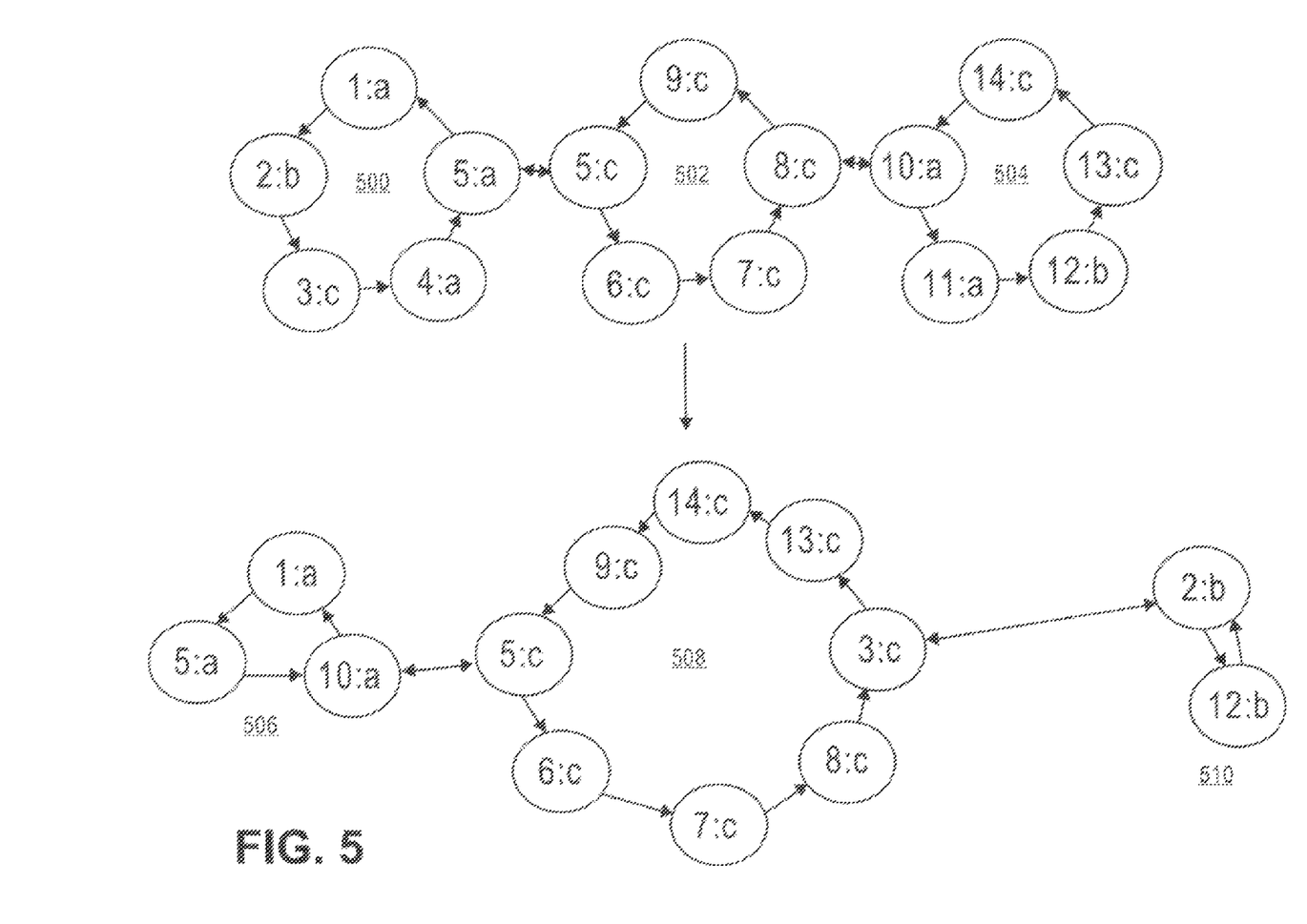
FIG. 5 illustrates an exemplary dynamic configuration of sub-rings in a multi-ring Totem ring network in accordance with the present invention.
Figure 6:
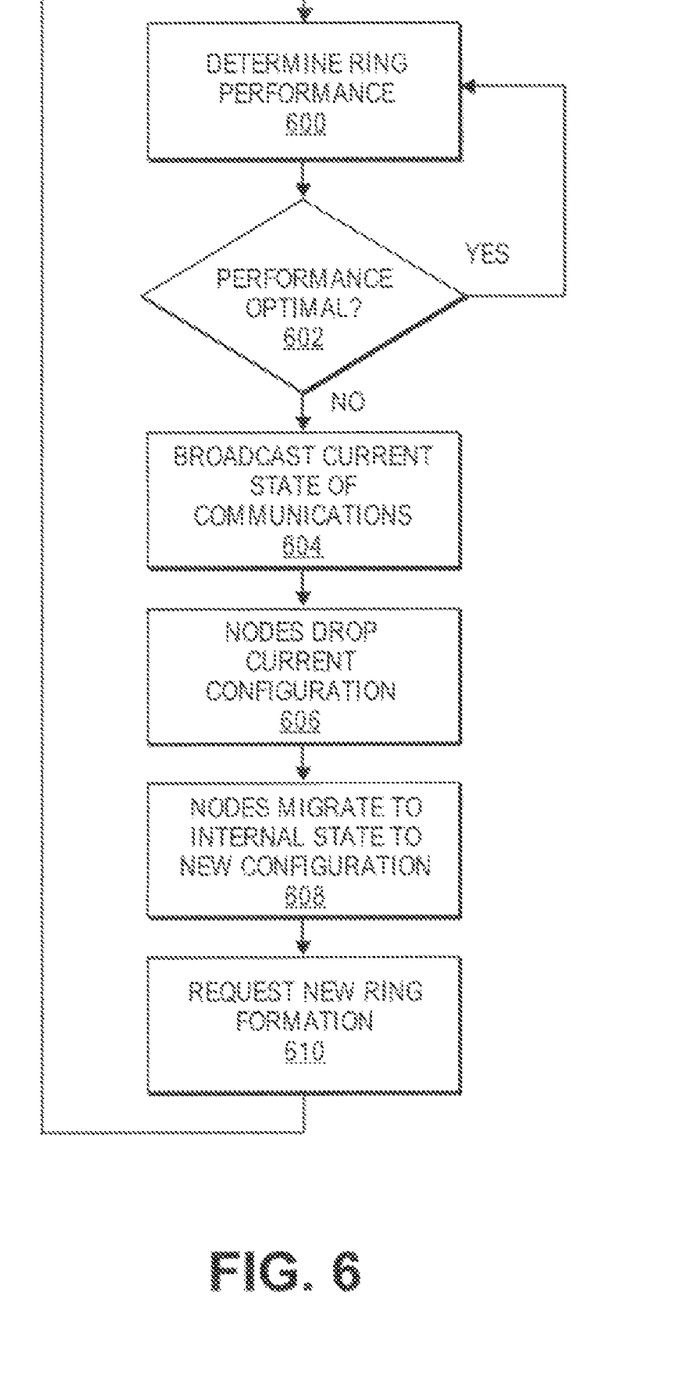
FIG. 6 illustrates a general process flow of the present invention.

Reference will now be made in detail to the exemplary embodiments of the invention, which are illustrated in the accompanying drawings. FIGS. 1-3 serve to illustrate a system and structure of various components related to embodiments of the present invention. Next, FIGS. 4-5 illustrate some of the concepts of multi-ring Totem networks. Finally, FIG. 6 illustrates a general process flow of one embodiment of the present invention. Wherever possible, the same reference numbers will be used throughout the drawings to refer to the same or like parts. FIGS. 1-6 will now be further described.

Referring now to FIG. 1, a system 100 generally designates a multi-ring Totem ring network embodying features of the present invention. As shown, system 100 is a virtual synchrony system comprising a first Totem ring 102 and a second Totem ring 104. Rings 102 and 104 are interconnected together via a link 106. Link 106 may be link across a local area network or a wide area network (WAN).

In the example shown in FIG. 1, ring 102 comprises a local area network (LAN) 106 through which four Totem nodes 110, 112, 114, and 116 are interconnected. Similarly, ring 104 is shown comprising a LAN 118 through which Totem nodes 120, 122, 124, 126, and 128 are interconnected. Although FIG. 1 illustrates two Totem rings, one skilled in the art will recognize that system 100 may comprise any number of sub-rings. Likewise, each sub-ring may comprise any number of nodes.

Nodes 110, 112, 114, 116, 120, 122, 124, 126, and 128 refer to any device that is capable of being connected as part of network system 100. For example, these nodes may represent a general purpose computer, a server, a router, etc. In general, the nodes 110, 112, 114, 116, 120, 122, 124, 126, and 128 are running various processes or applications, for example, for providing server functions, distributed applications, web applications, database operations, and the like.

As shown, each of nodes 110, 112, 114, 116, 120, 122, 124, 126, and 128 are coupled to networks 108 and 118 respectively. These links are well known to those skilled in the art. For example, nodes 110, 112, 114, 116, 120, 122, 124, 126, and 128 may utilize well known protocols, such as Ethernet, transmission control protocol/internet protocol (TCP/IP), or a standard network interface, Asynchronous Transport Mode (ATM), or the like, to connect to networks 108 and 118.

Referring now to FIG. 2, an exemplary structure for the nodes is illustrated. For purposes of illustration, FIG. 2 shows node 110 as a representative of all the nodes. In general, nodes 110, 112, 114, 116, 120, 122, 124, 126, and 128 are likely to be substantially similar in their structure. However, one skilled in the art will recognize that various nodes may differ in varying degrees depending on their specific function, location, etc. As shown, node 110 comprises a host processor 200, a memory 202, a storage device 204, a cache 206, an input/output interface 208 (such as a network interface card), and a bus 210, which interconnects these components. These components are well known to those skilled in the art. Of note, node 110 may be equipped with several network interfaces, similar to interface 208 to provide an interface to additional Totem rings (not shown).

Node 110 may further comprise a ring configuration 212 in its memory 202. Ring configuration 212 records information about the current ring configuration of node 110. This information may include parameters, such as the multicast addresses and processor identifiers of the other nodes. In addition, ring configuration 212 may include group membership information of the other nodes.

FIG. 3 illustrates an exemplary software architecture for the nodes in system 100. From a software perspective, each of nodes 110, 112, 114, 116, 120, 122, 124, 126, and 128 may be comprise a number of protocol layers, which are substantially similar. Thus, for purposes of brevity, FIG. 3 again utilizes node 110 as a representative of all nodes shown in FIG. 1. One skilled in the art will recognize that the software architecture illustrated is an abstract representation of the software instructions being executed by processor 200 in node 110.

As shown in FIG. 4, the software architecture of node 110 comprises a network layer 300, a membership layer 302, a total order layer 304, a recovery layer 306, an application layer 208, and a messaging layer 310. These components will now be further described.

Network layer 300 is responsible for interfacing with interface 208 and processing the receiving and transmitting of messages or packets of messages, in total order to and from the Network layer 300 may also be responsible for assembling segments, of a message as they are received via interface 208.

Membership layer 302 ensures consensus on membership configuration among configuration members and termination, such that every member node installs the same configuration with an agreed membership within a bounded time, unless it fails. Membership layer 302 may also comprise instructions for recovering a token and generates a token and recover messages that had not been received by some members when failure occurs.

Total order layer 304 implements instructions related to reliable delivery, total ordering of messages and flow control of the messages. For example, total order layer 304 may review the timestamp on each collected message, and orders the messages in a sequential order relative to other messages based on the timestamp. In general, total order layer 304 is configured to comply with the known Totem ring protocols.

Recovery layer 306 implements recovery in the event of a member node failure, link failure, and token loss failure.

Application layer 308 provides an interface with the application (not shown) for which messages are being received or sent. For example, application layer 308 may manage and coordinate the relationship and interaction of application processes running on other nodes. In accordance with the Totem ring protocol, application processes may run on a plurality of nodes and are herein referred to as a "group". Accordingly, a message sent to a group is sent to all nodes having processes that are part of the group. Application layer 308 also facilitates the communication of information and received messages between one process and other processes and groups in system 100. The process 410 generally comprises an application program configured for processing a message received from the process group management layer 406. Upon receipt of such a message, the process 410 processes the message and generates a response to a message sender layer 414, as indicated schematically by an arrow 412.

Messaging layer 310 is configured to receive the response of an application and processes that response into packets that are suitable for transmission across network 108. Messaging layer 310 will then transfer these packets to interface 208 for transmission to network 108.

In order to assist in explaining the principles of the present invention, FIG. 4 is now provided to illustrate the concept of a multi-ring Totem network. As shown, two rings are shown.

Sub-ring 400 comprises nodes 1, 2, 3, 4, and 5. Sub-ring 402 comprises nodes 5, 6, 7, 8, and 9.

Locality of groups refers to whether nodes in a sub-ring belong to the same group. Thus, ideally, the nodes of sub-ring 400 are each a member of the same group and the nodes sub-ring 402 are each a member of the same group. If a group is split among different sub-rings, then messages must forwarded through the gateway node, i.e., node 5. As noted above, one advantage of the present invention is to minimize the number of messages that are forwarded by gateways.

FIG. 5 illustrates a reconfiguration of a multi-ring Totem network in accordance with the present invention. As shown, the Totem network initially comprises three sub-rings 500, 502, and 504. In sub-ring 500, nodes 1, 2, 3, 4, and 5 are members of different groups. For example, nodes 1, 4, and 5 are members of group "a", while node 2 is a member of group "b" and node 3 is a member of group "c". Similarly, sub-ring 504 also exhibits a sub-optimal locality of groups since nodes 10 and 11 are members of group "a", node 12 is a member of group "b", and nodes 13 and 14 are members of group "c". However, sub-ring 502 exhibits an optimal locality of groups since all the nodes are members of group "c". Nonetheless, this initial configuration of sub-rings is likely sub-optimal due to the poor locality of groups.

In accordance with the present invention, a heuristic could be applied to improve the locality of groups and determine a new configuration of multicast address/processor relationships, i.e., a new sub-ring configuration. For example, as shown in FIG. 5, the sub-ring configuration may be transitioned to where nodes 1, 5, and 10 are part of sub-ring 506, nodes 5, 6, 7, 8, 3, 13, 14, and 9 are part of sub-ring 508, and nodes 2 and 12 are members of sub-ring 510. This new configuration is considered preferable because of the optimally locality of groups. This example merely demonstrates the simple case of one group per processor. However, one skilled in the art will recognize that the present invention can encompass to cases where multiple groups per processor are supported.

FIG. 6 illustrates a general process flow of the present invention. In phase 600, one or more of nodes 110, 112, 114, 116, 120, 122, 124, 126, and 128 measure the performance of their sub-ring. For example, nodes 114 and 120, as gateway nodes, may measure the performance of sub-rings 102 and 104. Parameters that may be measured for performance are items, such as message count for each multicast address, number of messages forwarded between sub-rings 102 and 104, latency, error messages, and the like. For example, total order layer 304, recovery layer 306, application layer 308, and messaging layer 310 may collect performance data while performing their respective functions.

Although nodes 114 and 120 are provided as examples of nodes measuring performance any of nodes 110, 112, 114, 116, 120, 122, 124, 126, and 128 may be configured to performance of sub-rings 102 and 104. Alternatively, a select few of nodes 110, 112, 114, 116, 120, 122, 124, 126, and 128 may be designated as "master" nodes that are tasked with measuring the performance of sub-rings 102 and 104 and commanding reconfiguration, if needed. Nodes 110, 112, 114, 116, 120, 122, 124, 126, and 128 may also share their performance measurements with each other.

In phase 602, one or more of nodes 110, 112, 114, 116, 120, 122, 124, 126, and 128 determine whether the performance of sub-rings 102 and 104 is optimal. For example, one or more thresholds or benchmarks for performance may be configured into nodes 110, 112, 114, 116, 120, 122, 124, 126, and 128 in order to ensure performance of their application service. Such thresholds may be configured by an administrator, for example, upon start up of network system 100. In addition, the usage of the message count transmitted since the last reconfiguration to determine if a reconfiguration would be worthwhile may also be considered in determining whether performance is optimal. This heuristic may be useful, for example, to allow for a stabilization period in the event of a startup, or failure, and may help to prevent "thrashing" of sub-ring configurations. If the performance is considered unacceptable, then processing may flow to phase 604. Otherwise, operations of network system 100 continue and processing may repeat at phase 600.

In phase 604, one or more of nodes 110, 112, 114, 116, 120, 122, 124, 126, and 128 attempts to initiate reconfiguration by broadcasting their current internal state of communications of the sub-ring. For example, one or more of nodes 110, 112, 114, 116, 120, 122, 124, 126, and 128 may broadcast to a group subscribed to by all nodes in system 100 a message containing a list of processor ids and their associated new multicast communication address and port. In some embodiments, these functions are performed by membership layer 302 in the nodes. Once every node has received a copy of this message, then processing may flow to phase 606.

In phase 606, one or more of nodes 110, 112, 114, 116, 120, 122, 124, 126, and 128 discard their current sub-ring configuration. As noted above, membership layer 302 may perform this action in response to receiving the message.

In phase 608, one or more of nodes 110, 112, 114, 116, 120, 122, 124, 126, and 128 migrate to a new configuration. For example, membership layer 302 may modify ring configuration 212 to reflect the new configuration. Processing may then flow to phase 610.

In phase 610, one or more of nodes 110, 112, 114, 116, 120, 122, 124, 126, and 128 sending requests for formation of a new sub-ring. This action triggers membership layer 302 to ensure consensus among the nodes, such that every member node installs the same configuration with an agreed membership within a bounded time. Once consensus has been achieved, nodes 110, 112, 114, 116, 120, 122, 124, 126, and 128 may return to their normal processing and a new cycle of the process may repeat at phase 600.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   measuring a performance of nodes of a sub-ring;
   determining that the performance of the nodes of the sub-ring is not optimal;
   broadcasting, to at least a portion of the nodes of a multi-ring system, a message containing a list of processor identifiers and associated new multicast communication addresses and ports corresponding to a new sub-ring configuration based on the determining that the performance of the sub-ring is not optimal;
   migrating at least a portion of the nodes of the sub-ring to the new sub-ring configuration in response to the broadcasting; and
   ensuring consensus among the nodes of the multi-ring system about the new sub-ring configuration.

2. The method of claim 1, wherein the measuring the performance of the nodes of the sub-ring comprises measuring a number of messages being forwarded through a gateway node of the sub-ring.

3. The method of claim 1, wherein the measuring the performance of the nodes of the sub-ring comprises measuring a locality of groups of the nodes of the sub-ring.

4. The method of claim 1, wherein the measuring the performance of the nodes of the sub-ring comprises measuring a latency of the sub-ring.

5. The method of claim 1, wherein the determining that the performance of the sub-ring is not optimal is based on a threshold of one or more parameters of the sub-ring.

6. The method of claim 1, wherein the determining that the performance of the sub-ring is not optimal is based on a number of messages transmitted since a last reconfiguration of the sub-ring.

7. A non transitory computer readable medium comprising computer executable code, which, when executed on a processing device, cause the processing device to perform:
   measuring a performance of nodes of a sub-ring; determining that the performance of the nodes of the sub-ring is not optimal; broadcasting, to at least a portion of the nodes of a multi-ring system, a message containing a list of processor identifiers and associated new multicast communication addresses and ports corresponding to a new sub-ring configuration based on the determining that the performance of the sub-ring is not optimal;
   migrating at least a portion of the nodes of the sub-ring to the new sub-ring configuration in response to the broadcasting; and
   ensuring consensus among the nodes of the multi-ring system about the new sub-ring configuration.

8. A system comprising:
   a multi-ring Totem network configured to dynamically configure membership of nodes in sub-rings;
   a second sub-ring comprising another a second set of nodes having respective group memberships; and
   wherein at least some of the nodes of the sets nodes in sub-rings are configured to measure a performance of each of the node's sub-ring, to determine whether the performance of each of the node's sub-ring is optimal, and
   to dynamically reconfigure each of the node's sub rings when the performance of each of the node's sub ring is not optimal by broadcasting, to at least a portion of the nodes of the multi-ring Totem network, a message containing a list of processor identifiers and associated new multicast communication addresses and ports corresponding to a new sub-ring configuration.

9. The system of claim 8, wherein the membership of nodes are configured to measure a performance of each of their sub-rings based on measuring a number of messages being forwarded through a gateway node of their sub-ring.

10. The system of claim 8, wherein the membership of nodes are configured to measure a performance of each of their sub-rings based on measuring a locality of groups nodes of their sub-ring.

11. The system of claim 8, wherein the membership of nodes are configured to measure performance of each of their sub-rings based on measuring a latency of their sub-ring.

12. The system of claim 8, wherein the membership of nodes are configured to determine whether the performance is optimal based on a number of messages transmitted since the last reconfiguration of their sub-ring.

13. The system of claim 8, wherein the membership of nodes are configured to broadcast a message containing a list of processor ids and their associated new muiticast communication addresses and ports when attempting to dynamically reconfigure their sub-rings.

14. A method comprising:
   measuring a performance of at least two sub-rings;
   determining that the performance of at least one of the sub-rings is not optimal;
   broadcasting to all nodes of the two sub-rings a message containing a list of processor ids and their associated new multicast communication addresses and ports corresponding to a new sub-ring configuration based on the performance;
   migrating at least a portion of the nodes of the at least two sub-rings to the new sub-ring configuration in response to the broadcasting; and
   ensuring consensus among all the nodes of the at least two sub-rings about the new sub-ring configuration.

15. A method comprising:
   measuring a performance of nodes of a single ring;
   determining that the performance of the nodes of the single ring is not optimal;
   broadcasting to all the nodes of the single ring a message containing a list of processor ids and their associated new multicast communication addresses and ports corresponding to a new multiple sub-ring configuration based on the performance;
   migrating at least a portion of the nodes of the single ring to the new multiple sub-ring configuration in response to the broadcasting; and
   ensuring consensus among all the nodes of the single ring about the new multiple sub-ring configuration.

* * * * *